United States Patent
Joo et al.

(10) Patent No.: US 7,945,713 B2
(45) Date of Patent: May 17, 2011

(54) APPARATUS AND METHOD FOR CREATING DEVICE ASSOCIATION/CONTROL INFORMATION FOR REALISTIC MEDIA REPRESENTATION

(75) Inventors: Sang-Hyun Joo, DaeJeon (KR);
Bum-Suk Choi, DaeJeon (KR);
Hae-Ryong Lee, DaeJeon (KR);
Kwang-Rho Park, DaeJeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 286 days.

(21) Appl. No.: 12/201,127

(22) Filed: Aug. 29, 2008

(65) Prior Publication Data

US 2009/0083452 A1    Mar. 26, 2009

(30) Foreign Application Priority Data

Sep. 21, 2007    (KR) .................. 10-2007-0096920

(51) Int. Cl.
*G06F 13/10* (2006.01)
(52) U.S. Cl. .................. 710/16; 710/15; 710/17
(58) Field of Classification Search .................. None
See application file for complete search history.

(56) References Cited

U.S. PATENT DOCUMENTS

| | | | | |
|---|---|---|---|---|
| 6,779,004 | B1 * | 8/2004 | Zintel | 709/227 |
| 6,792,323 | B2 * | 9/2004 | Krzyzanowski et al. | 700/90 |
| 6,898,645 | B2 * | 5/2005 | Abujbara | 710/17 |
| 6,912,428 | B2 * | 6/2005 | Nakai et al. | 700/18 |
| 7,010,624 | B1 * | 3/2006 | Zhou et al. | 710/8 |
| 7,017,148 | B2 * | 3/2006 | Kumar | 717/114 |
| 7,316,022 | B2 * | 1/2008 | Nishio | 719/321 |
| 7,444,438 | B2 * | 10/2008 | Saint-Hilaire et al. | 710/11 |
| 7,483,985 | B2 * | 1/2009 | Karaoguz et al. | 709/226 |
| 7,536,539 | B2 * | 5/2009 | Blanchard et al. | 713/2 |
| 7,555,543 | B2 * | 6/2009 | Encarnacion et al. | 709/223 |
| 7,689,510 | B2 * | 3/2010 | Lamkin et al. | 705/51 |
| 7,730,223 | B1 * | 6/2010 | Bavor et al. | 710/8 |
| 7,730,224 | B2 * | 6/2010 | Kikuchi | 710/8 |
| 7,779,097 | B2 * | 8/2010 | Lamkin et al. | 709/223 |

(Continued)

FOREIGN PATENT DOCUMENTS

KR    10-2004-0090330    10/2004

(Continued)

*Primary Examiner* — Cheng-Yuan Tseng
(74) *Attorney, Agent, or Firm* — Staas & Halsey LLP

(57) ABSTRACT

Provided is an apparatus and method for creating device association/control information for realistic media representation. The device includes a media analyzer, a device information creator, a device parameter creator, a device attribute database, a device control information creator, and a device control stream creator. The media analyzer analyzes media to determine control values and control times for control parameters of respective devices to be associated for media reproduction. The device information creator creates device information by searching peripheral devices connected to a media reproduction device. The device parameter creator creates device parameter information by extracting controllable factors for the respective devices. The device attribute database stores the device information and the device parameter information. The device control information creator creates device control information including control values and control times for the respective device parameters. The device control stream creator creates a device control stream by converting the device control information into a stream-format binary code in the order of reproduction. Herein, one or more devices are associated according to the contents of the media. The apparatus and method can provide the optimal media representation effect by controlling peripheral devices suitably for an available environment by creating a signal for controlling the peripheral devices according to the media contents.

15 Claims, 7 Drawing Sheets

U.S. PATENT DOCUMENTS

| | | | | |
|---|---|---|---|---|
| 7,844,748 B2 * | 11/2010 | Yoon et al. | | 710/8 |
| 2002/0078447 A1 * | 6/2002 | Mizutome et al. | | 725/37 |
| 2002/0147791 A1 * | 10/2002 | Choi | | 709/217 |
| 2003/0135859 A1 * | 7/2003 | Putterman et al. | | 725/78 |
| 2003/0194968 A1 * | 10/2003 | Young | | 455/45 |
| 2004/0117848 A1 * | 6/2004 | Karaoguz et al. | | 725/134 |
| 2004/0208480 A1 * | 10/2004 | Yoon et al. | | 386/69 |
| 2005/0135341 A1 * | 6/2005 | Kim | | 370/352 |
| 2005/0138137 A1 * | 6/2005 | Encarnacion et al. | | 709/217 |
| 2005/0197965 A1 * | 9/2005 | Takabayashi et al. | | 705/59 |
| 2005/0216949 A1 * | 9/2005 | Candelora et al. | | 725/134 |
| 2006/0155858 A1 * | 7/2006 | Kim | | 709/227 |
| 2006/0242315 A1 * | 10/2006 | Nichols | | 709/231 |
| 2007/0136778 A1 * | 6/2007 | Birger et al. | | 725/117 |
| 2007/0180466 A1 * | 8/2007 | Ando et al. | | 725/37 |
| 2007/0192813 A1 * | 8/2007 | Kim | | 725/100 |
| 2007/0220114 A1 * | 9/2007 | Kaarela et al. | | 709/219 |
| 2007/0258718 A1 * | 11/2007 | Furlong et al. | | 398/106 |
| 2007/0260766 A1 * | 11/2007 | Kim et al. | | 710/15 |
| 2008/0027953 A1 * | 1/2008 | Morita et al. | | 707/100 |
| 2008/0046944 A1 * | 2/2008 | Lee et al. | | 725/110 |
| 2008/0050096 A1 * | 2/2008 | Ryu | | 386/99 |

FOREIGN PATENT DOCUMENTS

| | | |
|---|---|---|
| KR | 10-2005-0085836 | 8/2005 |
| KR | 1020070047626 | 5/2007 |

* cited by examiner

APPARATUS AND METHOD FOR CREATING DEVICE ASSOCIATION/CONTROL INFORMATION FOR REALISTIC MEDIA REPRESENTATION

CROSS-REFERENCE TO RELATED APPLICATIONS

This application claims priority under 35 U.S.C. §119 to Korean Patent Application No. P2007-96920, filed on Sep. 21, 2007, the disclosure of which is incorporated herein by reference in its entirety.

BACKGROUND OF THE INVENTION

1. Field of the Invention

The present disclosure relates to an apparatus and method for creating device association/control information for realistic media representation, and more particularly, to an apparatus and method for creating device association/control information for realistic media representation, which can represent media more realistically by associating a variety of peripheral devices for media representation.

This work was supported by the IT R&D program of MIC/IITA. [2007-S-010-01, The Development of Ubiquitous Home Media Service System based on SMMD]

2. Description of the Related Art

A multimedia is a variety of media that stores characters, voices, figures, pictures, etc. that transfer some actions from one side to another side. Basically, the multimedia includes pictures and sounds and is represented in association with audio/video (A/V) devices such display devices and speakers.

With the development of information technology, users want to obtain more information from media and desire more realistic media representation.

Thus, the media is being diversified into interactive media including additional information, custom media, rich media, five-sense media, immersive media, virtual-reality media, etc. Also, media representation devices are evolving into digital televisions (DTVs), digital multimedia broadcasting (DMB) phones, and wall display devices that use mirrors, glasses, and wall surfaces.

FIG. 1 is a block diagram of a conventional single-media single-device (SMSD) service system. In the SMSD service, media are mapped in one-to-one correspondence with devices.

Stereo audio/video media related to heating and sight is being developed to provide more realistic media representation in the SMSD service. However, the SMSD service is limited in the number of the stimuli provided to a user, because only one device can be associated for representation of one media.

Meanwhile, research is being conducted to provide a single-media multi-device (SMMD) service that can associate one or more devices with one media for realistic media representation.

Examples of the SMMD service include: tools for displaying presentations on several display devices; multi-presentation for representing various materials, such as video data, web pages and pictures, through several devices; and services for receiving OPS data at regular intervals, storing movement locations, and representing the location taken by a digital camera on the map through a program. The SMMD service further enhances the multimedia capability and provides digital platforms controllable by remote controllers.

However, the SMMD service is in the initial stage of development and is limited in terms of provided media and devices that can be associated for media representation.

In particular, related devices need to be associated according to the contents of media in order to simultaneously provide various effects that stimulate smell, touch, taste, etc. However, there has been no scheme for generating such association information and associating the related devices with media.

SUMMARY

Therefore, an object of the present invention is to provide an apparatus and method for creating device association/control information for realistic media representation, which can provide the optimal media representation effect by controlling peripheral devices suitably for an available environment by creating a signal for controlling the peripheral devices according to the media contents.

To achieve these and other advantages and in accordance with the purpose(s) of the present invention as embodied and broadly described herein, an apparatus for creating device association/control information for realistic media representation in accordance with an aspect of the present invention includes: a device information creator for creating device information by searching peripheral devices connected to a media reproduction device; a device parameter creator for creating device parameter information by extracting controllable factors for the respective devices; a device control information creator for creating device control information including control values and control times for the respective device parameters; and a device control stream creator for creating a device control stream by converting the device control information into a stream-format binary code in the order of reproduction, wherein one or more devices are associated according to the contents of the media.

The apparatus may further include: a media analyzer for analyzing media to determine control values and control times for control parameters of respective devices to be associated for media reproduction; and a device attribute database for storing the device information and the device parameter information.

The device attribute database may include an ne-media file system that stores the device information and the device parameter information for the respective device in a partial region.

The device information may include device identifiers and device attributes. The device parameter information may include a device attribute and a parameter identifier for each device. The device control information may include the control start time, the control end time, and the control values for the respective parameters of each device.

The device information, the device parameter information, and the device control information may be written based on XML.

To achieve these and other advantages and in accordance with the purpose(s) of the present invention, a method for creating a list and control parameters for one or more devices connected to a media reproduction device in order to create device association/control information for realistic media representation in accordance with another aspect of the present invention includes: creating device information for the devices connected to the media reproduction device; creating device parameter information by extracting controllable factors for the respective devices; and storing the device information and the device parameter information.

The method may further include creating an ne-media file including the device information, the device parameter information, and media after the storing of the device information and the device parameter information.

The creating of the device information may include: searching devices connected to the media reproduction device; detecting the detailed specs including product names and model numbers of the searched devices on the basis of a pre-written device list; and giving an identifier to each of the searched devices to associate the detailed specs. Alternatively, the creating of the device information may include: requesting detailed specs from a device connected to the media reproduction device; giving an identifier to the device transmitting the detailed specs in response to the request; and associating the detailed specs with the given identifier.

To achieve these and other advantages and in accordance with the purpose(s) of the present invention, a method for creating device association/control information for realistic media representation in accordance with another aspect of the present invention includes: loading media; analyzing the media to determine the device association time, an association scheme, and a device to be associated according to the media contents; creating device control information in units of control parameters; converting the device control information to create a binary control stream for each device; and transmitting the control stream to the corresponding device.

The device control information may include the control start time, the control end time, and a control value for the respective device parameters that are created based on XML. The control stream may be created by arranging one or more device information data in the order of control required for media reproduction.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF EMBODIMENTS

Hereinafter, specific embodiments will be described in detail with reference to the accompanying drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art.

Figure 1:
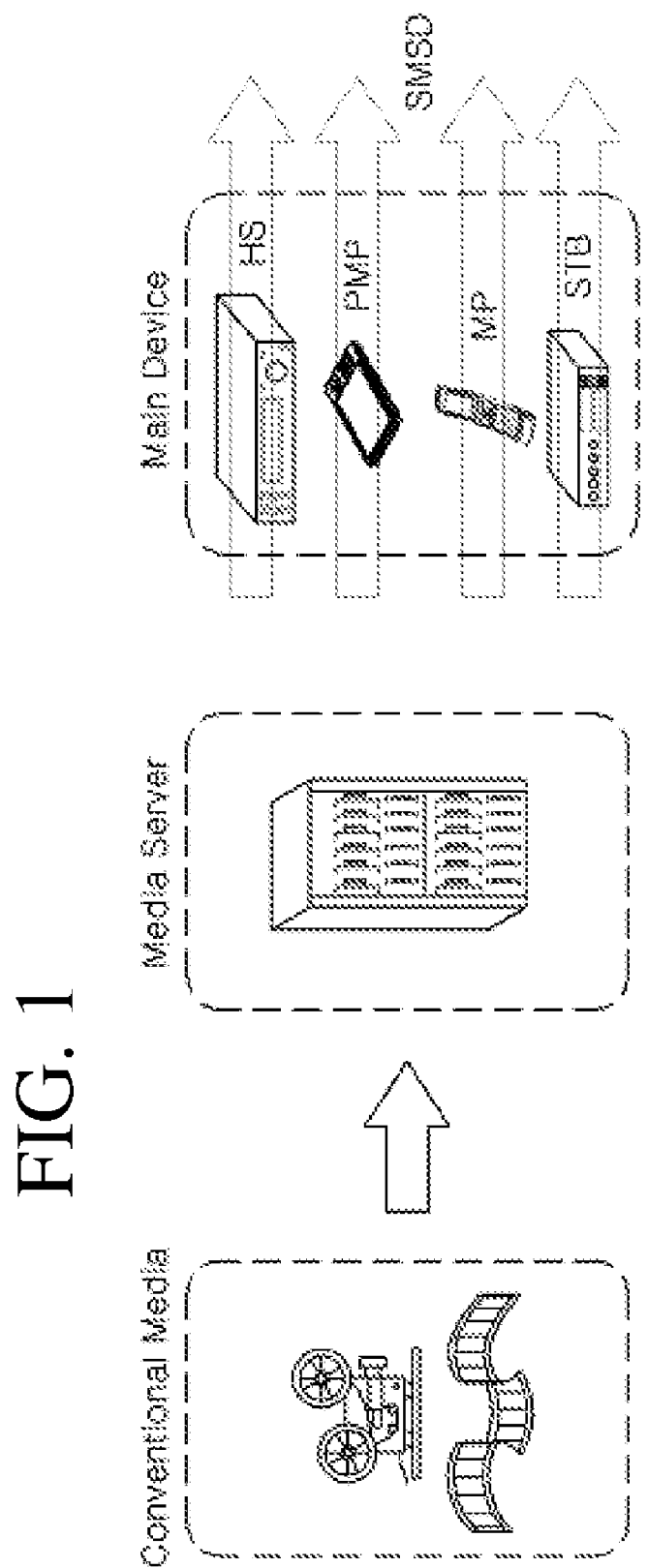
FIG. 1 is a block diagram of a conventional single-media single-device (SMSD) service system.
Figure 2:
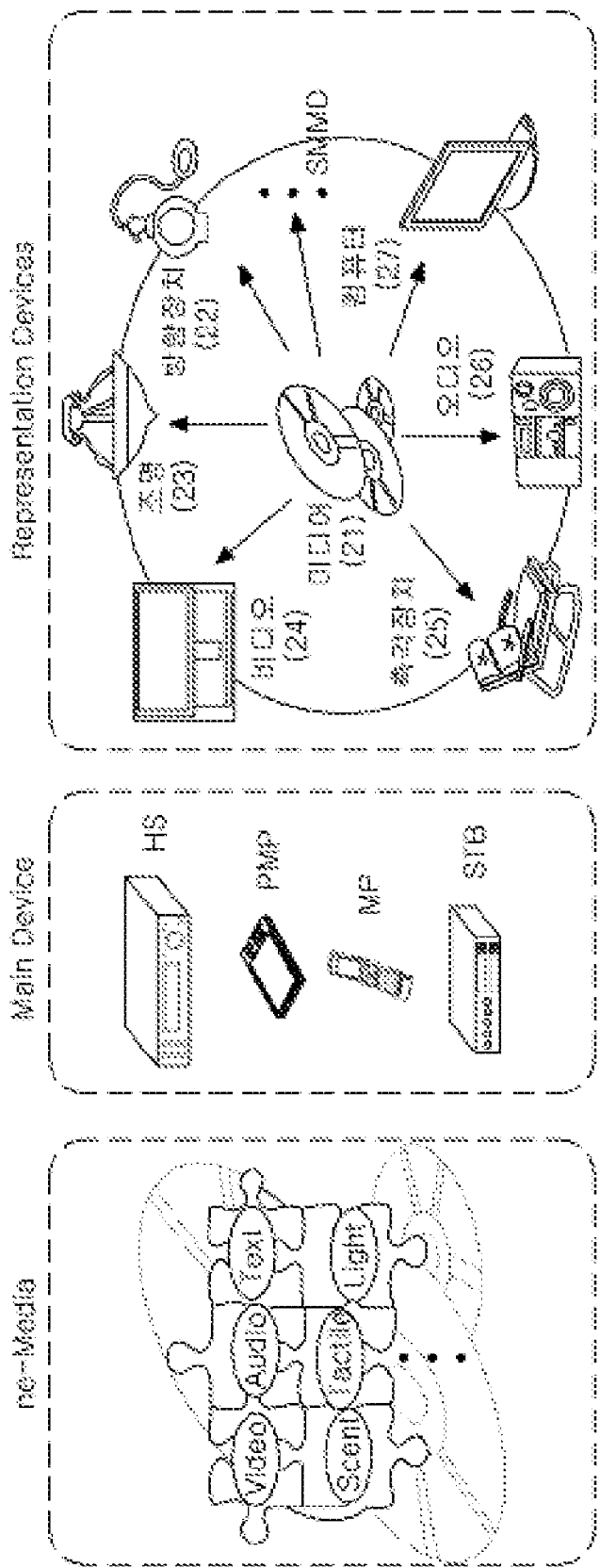
FIG. 2 is a block diagram of an SMMD service system according to an embodiment of the present invention.

FIG. 2 is a block diagram of an SMMD service system according to an embodiment of the present invention.

Referring to FIG. 2, the SMMD service system includes media 21 and a plurality of devices 22 through 27 associated with the media 21.

The media 21 stores characters, voices, figures, pictures, etc. that transfer some actions from one side to another Examples of the media 21 include compact disks (CDs) and digital versatile disks (DVDs).

The devices 22 through 27 are associated with the media 21 for media representation. Examples of the devices 22 through 27 include a light device 23 for adjusting the brightness of light, a video device 24 for displaying pictures, a computer 27 for outputting characters, a scent device 22 for outputting scents (or odors), an audio device 26 for outputting sounds, and a tactile device 25 for outputting signals that stimulate touches.

A realistic media representation method for providing realistic media to users can be implemented using the following two schemes. The first scheme is to develop and use a realistic media representation device, and the second scheme is to associate a variety of devices peripheral to a user (hereinafter, referred to as peripheral devices) with media. The first scheme is cost-consuming because it must develop a new device, while the second scheme is cost-saving because it can utilize an existing media association device. A scheme for creating device association/control information for realistic media representation according to the present invention is relatively economical because it is similar to the second scheme.

Figure 3:
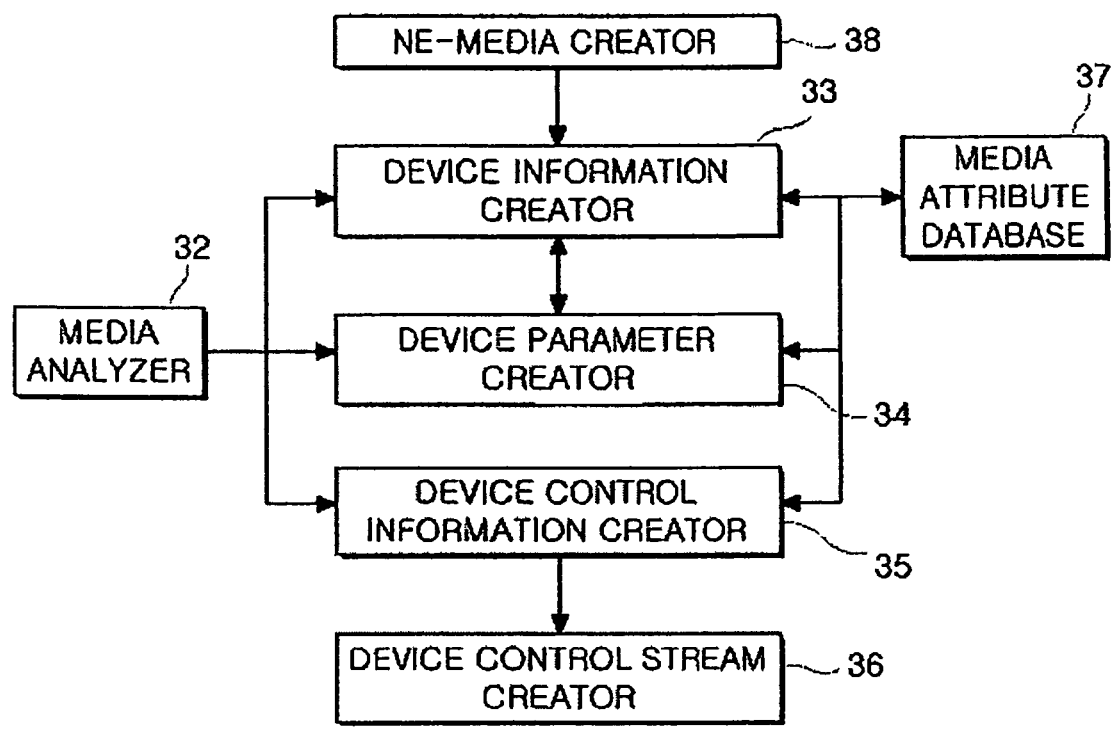
FIG. 3 is a block diagram of an apparatus for creating device association/control information for realistic media representation according to an embodiment of the present invention.

FIG. 3 is a block diagram of an apparatus for creating device association/control information for realistic media representation according to an embodiment of the present invention.

Referring to FIG. 3, the apparatus for creating device association/control information for realistic media representation includes: a media analyzer 32 for analyzing media to determine control values and control times for control parameters of respective devices to be associated for media reproduction; a device information creator 33 for creating device information by searching peripheral devices connected to a media reproduction device; a device parameter creator 34 for creating device parameter information by extracting controllable factors for the respective devices; a device attribute database 37 for storing the device information and the device parameter information; a device control information creator 35 for creating device control information including the control values and the control times for the respective device parameters; a device control stream creator 36 for creating a device control stream by converting the device control information into a stream-format binary code in the order of reproduction; and an ne-media file creator 38.

The media analyzer 32 loads media to analyze the contents of the media, and analyzes the media to determine the control values and the control times for the control parameters of the respective devices to be associated for media reproduction.

The device information creator 33 creates the device information for the respective devices by searching the peripheral devices connected to the media reproduction device.

The device information (DeviceInfo) includes a device identifier and a device attribute. The device identifier is a character or a number for identifying the attribute of a device associated with media. The device attribute corresponds to a method for the device to reproduce the media.

As shown in Table 1, the device identifiers may be expressed using hexadecimal values and the device attributes include a video device, an audio device, a wind device, a scent device, an illumination device, a shied device, and a light device. Further devices or undesignated devices may be discriminated as other device 1, . . . , other device n or may be given new suitable device names.

TABLE 1

| Value | Device | Detailed Description | Example |
|---|---|---|---|
| 0x00 | Video Device | Devices displaying still pictures or moving pictures | DTVs, hand-held phones |
| 0x01 | Audio Device | Devices outputting sounds | Audio devices |
| 0x02 | Wind Device | Devices outputting winds | Fans, coolers |
| 0x03 | Scent Device | Devices outputting scents (or odors) | Perfumers |
| 0x04 | Light Device | Devices outputting light | Illumination devices |
| 0x05 | Shield Device | Devices shielding light | Curtains |
| 0x06 | Vibration Device | Devices vibrating periodically or aperiodically | Vibrating chairs |
| 0x07 | Other Device 1 | — | — |
| 0x08 | Other Device 2 | — | — |
| ... | ... | ... | ... |
| 0xFF | Other Device n | — | — |

The device parameter creator 34 creates device parameter information by extracting controllable factors for respective devices.

The device parameter information (DeviceParameterInfo) is device control-related parameter information including a parameter identifier and a parameter attribute for each device. Examples of the device parameter information are shown in Tables 2 through 4. The parameter identifier is a character or a number for identifying each parameter attribute, and the parameter attribute is a controllable factor for each device, such as sizes strength, brightness, and direction.

Table 2 shows device parameter information of a video device which has controllable factors such as size, brightness, contrast, and resolution.

TABLE 2

| Value | Parameter | Detailed Description |
|---|---|---|
| 0x00 | Size | 4:3, 16:9, Full Screen |
| 0x01 | Brightness | Strong, Medium, Weak, Fine Control Unit |
| 0x02 | Contrast | Strong, Medium, Weak, Fine Control Unit |
| 0x03 | Resolution | 1024 × 768, 720 × 480 |
| ... | ... | ... |
| 0xFF | — | — |

Table 3 shows device parameter information of an audio device which has controllable factors such as volume of sound, supply direction of sound, and supply location of sound.

TABLE 3

| Value | Parameter | Detailed Description |
|---|---|---|
| 0x00 | Volume | Volume of Sound |
| 0x01 | Direction | Supply Direction of Sound |
| 0x02 | Location | Supply Location of Sound |

TABLE 3-continued

| Value | Parameter | Detailed Description |
|---|---|---|
| 0x03 | — | |
| ... | ... | ... |
| 0xFF | — | — |

Table 4 shows device parameter information of a wind device which has controllable factors such as strength of wind, direction of wind, and height of wind.

TABLE 4

| Value | Parameter | Detailed Description |
|---|---|---|
| 0x00 | Volume | Strength of Wind |
| 0x01 | Direction | Direction of Wind |
| 0x02 | Height | Height of Wind |
| 0x03 | — | |
| ... | ... | ... |
| 0xFF | — | — |

The device attribute database 37 stores device information and device parameter information.

Also, device control information and control streams generated using the device information and the device parameter information may be stored.

The device control information creator 35 creates device control information (Device ControlInfo) using the device information and the device parameter information. The device control information is used to control the corresponding device for media representation.

Figure 4:
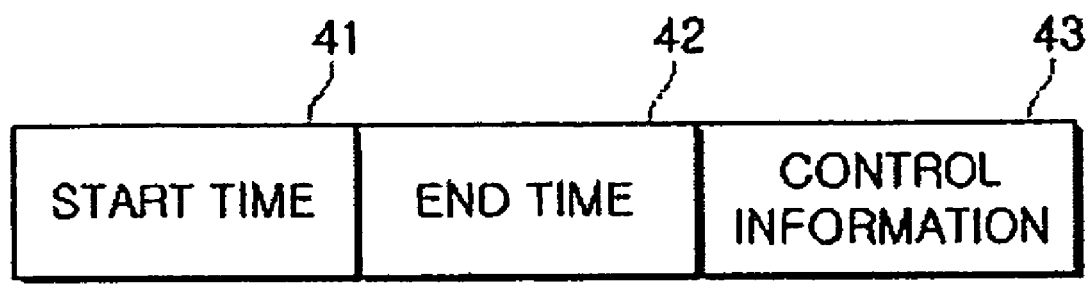
FIG. 4 illustrates a format of device control information according to an embodiment of the present invention.

FIG. 4 illustrates a format of device control information according to an embodiment of the present invention.

Referring to FIG. 4, device control information includes the control start time 41, the control end time 42, and a control value 43 for the respective parameters of each device.

The control start time 41 is the time to start control related to the corresponding parameter of the device, the control end time 42 is the time to end the control related to the corresponding parameter, the control value 43 is device parameter information.

The device information, the device parameter information and the device control information are written based on XML.

The device control stream creator 36 generates a control stream for each device by converting device control information into a stream-type binary code in the order of reproduction.

Figure 5:
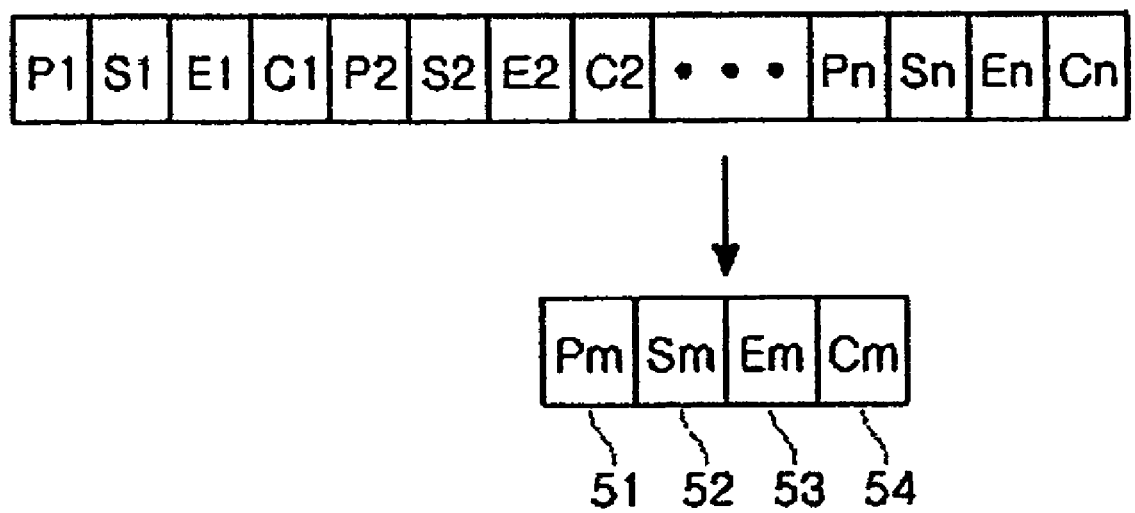
FIG. 5 illustrates a format of a device control stream according to an embodiment of the present invention.

FIG. 5 illustrates a format of the device control stream according to an embodiment of the present invention.

Referring to FIG. 5, the device control stream includes parameter types P1~Pn, control start times S1~Sn, control end times E1~En, and control values C1~Cn.

The parameter types, the control start times, the control end times, and the control values are represented using a predetermined number of bits.

Herein, a Pm 51 is a parameter type, an Sm 52 is the control start time of the parameter Pm 51 controlled in the $m^{th}$ order, an Em 53 is the control end time and includes the $Cm^{th}$ device control information 53 of the parameter controlled in the $m^{th}$ order.

The ne-media file creator 38 generates an ne-media file system by which the device information and the device parameter information are defined.

Figure 6:
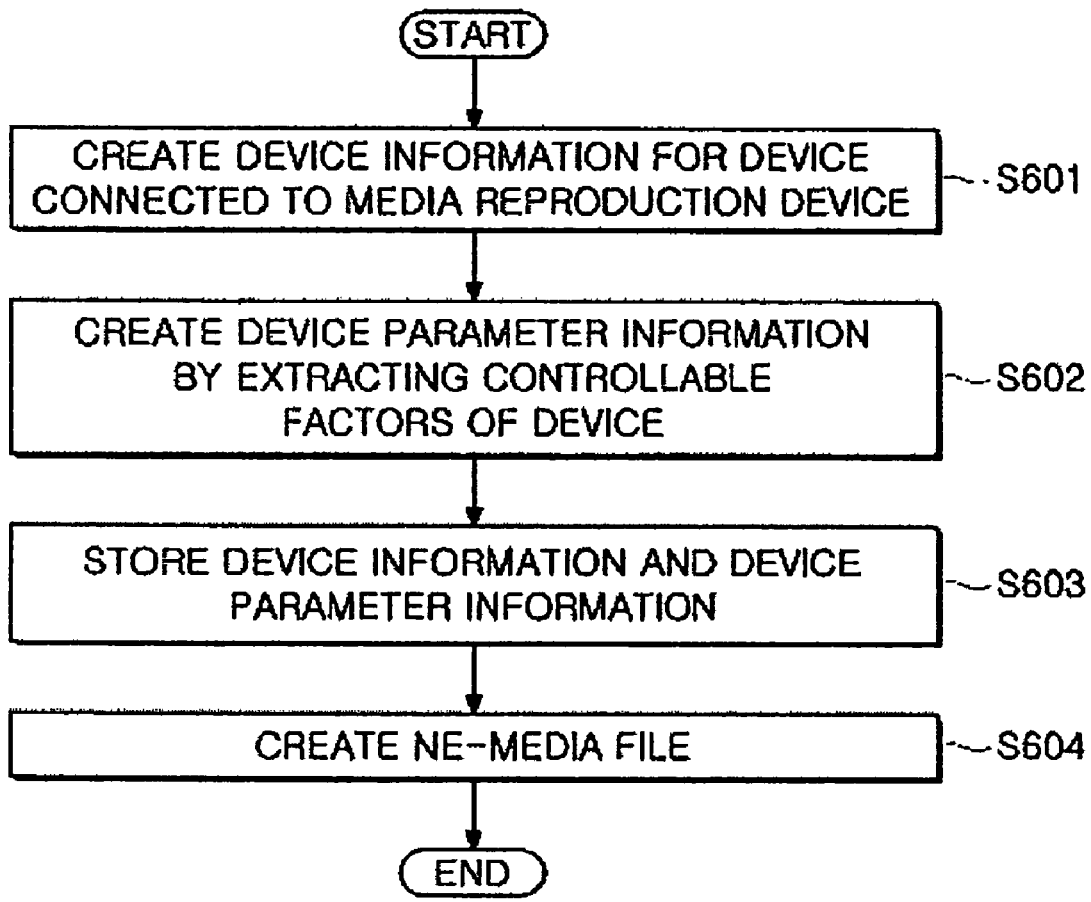
FIG. 6 is a flow diagram illustrating a method for creating device information and device parameter information for one or more devices connected to a media reproduction device according to an embodiment of the present invention.

FIG. 6 is a flow diagram illustrating a method for creating device information and device parameter information for one or more devices connected to a media reproduction device according to an embodiment of the present invention.

Referring to FIG. 6, device information for devices connected to a media reproduction device is created in operation S601.

Herein, the operation of creating the device information may include: searching a device connected to the media reproduction device; detecting the detailed specs such as a product name and a model number of the searched device on the basis of a pre-written device list; giving an identifier to each of searched devices; and associating the detailed specs.

Alternatively, the operation of creating the device information may include: requesting detailed specs from a device connected to the media reproduction device; giving an identifier to the device transmitting the detailed specs in response to the request; and associating the detailed specs with the given identifier.

In operation S602, controllable factors for each device are extracted to create device parameter information.

In operation S603, the device information and the device parameter information are stored.

In operation S604, ne-media file including the device information and the device parameter information is created.

Figure 7:
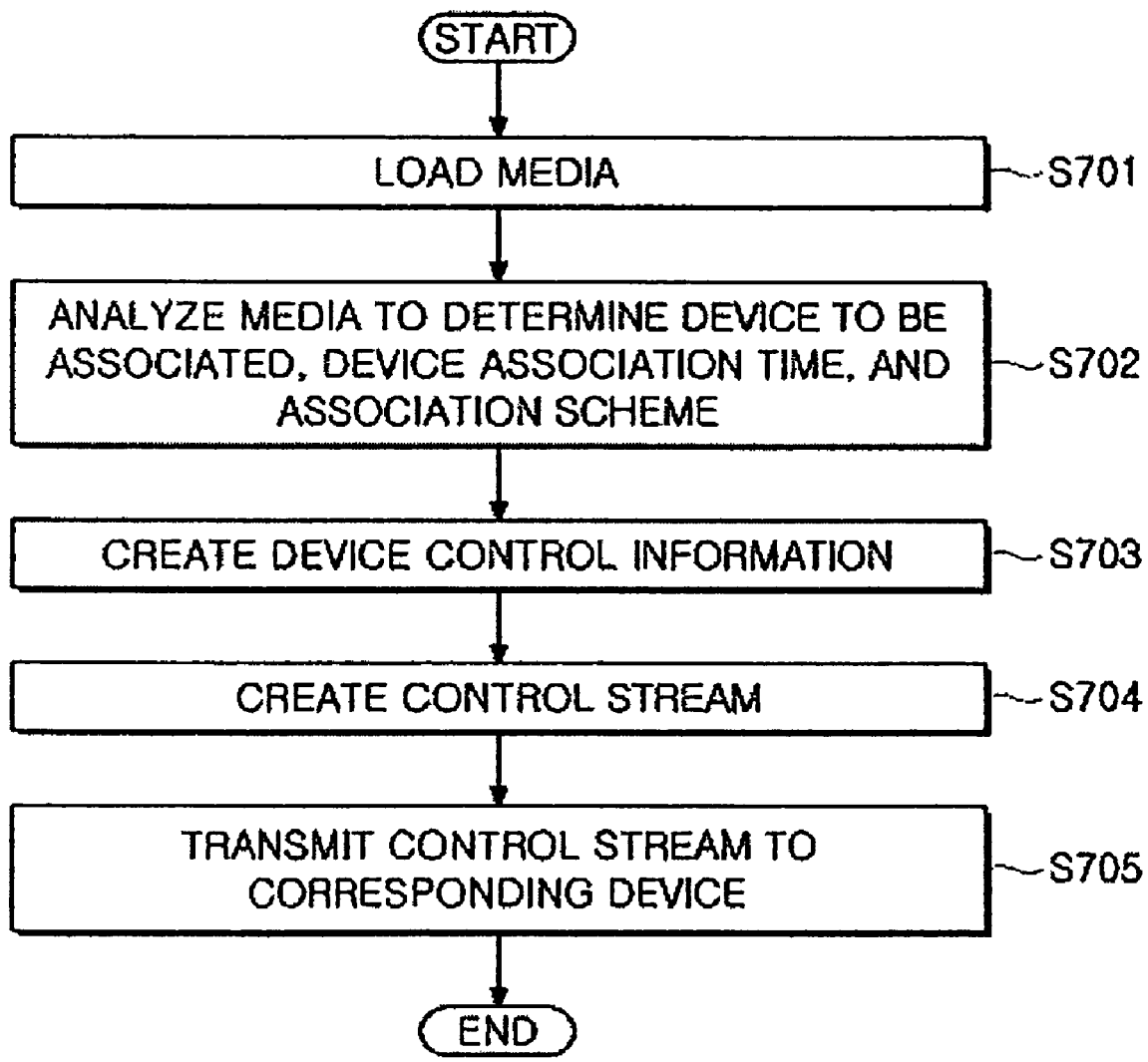
FIG. 7 is a flow diagram illustrating a method for creating device association/control information for realistic media representation according to an embodiment of the present invention.

FIG. 7 is a flow diagram illustrating a method for creating device association/control information for realistic media representation according to an embodiment of the present invention.

Referring to FIG. 7, media is loaded from a storage medium in operation S701. In operation S702, the media is analyzed to determine the device association time, an association scheme, and a device to be associated according to the media contents.

In operation S703, device control information is created in units of control parameters.

Herein, the device control information may include the control start time, the control end time, and a control value for the respective device parameters that are created based on XML.

In operation S704, the device control information is converted to create a binary control stream for each device.

Herein, the control stream may be created by arranging one or more device information data in the order of control required for media reproduction.

In operation S705, the control stream is transmitted to the corresponding device so that the corresponding device can be controlled according to the control stream.

As described above, the apparatus and method for creating device association/control information for realistic media representation according to the present invention can provide the optimal media representation effect by controlling peripheral devices suitably for an available environment by creating a signal for controlling the peripheral devices according to the media contents.

The present invention can maximize the media representation effects in the ubiquitous home with mobility such as DMB, smart phones, and personal data assistants (PDAs). Thus, the present invention can be applied to a variety of technical fields that use media for realistic services, virtual-reality services, complex device associated cyber education, medical/healthcare, games, home entertainments. etc.

Also, the use of the present invention makes it possible to develop high-tech industries by creating services through association of broadcastings, movies, contents and device manufacturers.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. An apparatus for creating device association/control information for realistic media representation, the apparatus comprising:
   a device information creator for creating a device information table by searching peripheral devices connected to a media reproduction device;
   a device parameter creator for creating a device parameter information table by extracting controllable factors for the respective devices;
   a device control information creator for creating device control information including control values and control times for the respective device parameters from the device information table and the device parameter information table; and
   a device control stream creator for creating a device control stream by converting the device control information into a stream-format binary code in the order of reproduction,
   wherein one or more devices are associated according to the contents of the media.

2. The apparatus of claim 1, further comprising a media analyzer for analyzing media to determine control values and control times for control parameters of respective devices to be associated for media reproduction.

3. The apparatus of claim 1, further comprising a device attribute database for storing the device information and the device parameter information.

4. The apparatus of claim 3, wherein the device attribute database comprises an ne-media file system that stores the device information and the device parameter information for the respective device in a partial region.

5. The apparatus of claim 1, wherein the device information comprises device identifiers and device attributes.

6. The apparatus of claim 1, wherein the device parameter information comprises a device attribute and a parameter identifier for each device.

7. The apparatus of claim 1, wherein the device control information comprises the control start time, the control end time, and the control values for the respective parameters of each device.

8. The apparatus of claim 1, wherein the device information, the device parameter information, and the device control information are written based on XML.

9. A method for creating a list and control parameters for one or more devices connected to a media reproduction device in order to create device association/control information for realistic media representation, the method comprising:
   creating device information for the devices connected to the media reproduction device;
   creating device parameter information by extracting controllable factors for the respective devices; and
   storing the device information and the device parameter information in corresponding device information and device parameter information tables.

10. The method of claim 9, further comprising creating an ne-media file including the device information, the device parameter information, and media after the storing of the device information and the device parameter information.

11. The method of claim 9, wherein the creating of the device information comprises:

searching devices connected to the media reproduction device;

detecting the detailed specs including product names and model numbers of the searched devices on the basis of a pre-written device list; and giving an identifier to each of the searched devices to associate the detailed specs.

12. The method of claim 9, wherein the creating of the device information comprises:

requesting detailed specs from a device connected to the media reproduction device;

giving an identifier to the device transmitting the detailed specs in response to the request; and associating the detailed specs with the given identifier.

13. A method for creating device association/control information for realistic media representation, the method comprising:

loading media;

analyzing the media to determine the device association time, an association scheme, and a device to be associated according to the media contents;

creating device control information tables in units of control parameters;

converting the device control information to create a binary control stream for each device; and transmitting the control stream to the corresponding device.

14. The method of claim 13, wherein the device control information includes the control start time, the control end time, and a control value for the respective device parameters that are created based on XML.

15. The method of claim 13, wherein the control stream is created by arranging one or more device information data in the order of control required for media reproduction.

* * * * *